United States Patent [19]
Frey

[11] Patent Number: 5,620,204
[45] Date of Patent: Apr. 15, 1997

[54] APPARATUS FOR INFLATING AN INFLATABLE VEHICLE OCCUPANT PROTECTION DEVICE

[75] Inventor: Stuart M. Frey, Bloomfield Hills, Mich.

[73] Assignee: TRW Vehicle Safety Systems Inc., Lyndhurst, Ohio

[21] Appl. No.: 583,314

[22] Filed: Jan. 5, 1996

[51] Int. Cl.⁶ .................................................. B60R 21/28
[52] U.S. Cl. ........................................... 280/737; 280/741
[58] Field of Search ................................... 280/737, 741, 280/736

[56] References Cited

U.S. PATENT DOCUMENTS

| | | | |
|---|---|---|---|
| 5,076,607 | 12/1991 | Woods et al. | 280/737 |
| 5,257,819 | 11/1993 | Frantom et al. | 280/737 |
| 5,345,876 | 9/1994 | Rose et al. | 280/737 |
| 5,350,192 | 9/1994 | Blumenthal | 280/737 |
| 5,356,176 | 10/1994 | Wells | 280/737 |
| 5,454,592 | 10/1995 | Blumenthal et al. | 280/737 |
| 5,464,247 | 11/1995 | Rizzi et al. | 280/737 |

*Primary Examiner*—Kenneth R. Rice
*Attorney, Agent, or Firm*—Tarolli, Sundheim, Covell, Tummino & Szabo

[57] ABSTRACT

An apparatus (10) for inflating an inflatable vehicle occupant protection device, such as an air bag (12), comprises a pressure vessel (14) having a closure wall (50) and a means (52) for forming a first opening in the closure wall (50). The pressure vessel (14) defines a chamber (18) containing a source for inflation. A breakaway section (72) of the closure wall (50) has an inner surface (140) which defines the first opening (136). The breakaway section (72) breaks away when a predetermined pressure level in the chamber (18) is reached. When the breakaway section (72) breaks away, a second opening (138) in the closure wall (50) is formed. Means (60, 48, 32) are provided for directing the inflation fluid from the second opening (138) into the vehicle occupant protection device (12). After the breakaway section (72) has broken away from the closure wall (50), a member (36) coaxial with the first opening (136) and in close axial proximity to the closure wall (50) has an outer surface (96) which projects through the first opening (136). Thereafter, the outer surface (96) of the member (36) supports and retains the breakaway section (72).

19 Claims, 5 Drawing Sheets

APPARATUS FOR INFLATING AN INFLATABLE VEHICLE OCCUPANT PROTECTION DEVICE

FIELD OF THE INVENTION

The present invention relates to an apparatus for inflating an inflatable vehicle occupant protection device, such as an air bag.

BACKGROUND OF THE INVENTION

A known apparatus for inflating an inflatable vehicle occupant protection device, such as an air bag, includes a pressure vessel for storing a quantity of inflation fluid under pressure. The inflation fluid comprises a combustible mixture of gases. Typically the pressure vessel includes a rupturable burst disk. When the vehicle encounters conditions indicative of a collision of a magnitude requiring inflation of an air bag to help protect a vehicle occupant, an igniter means is actuated. The igniter means ignites the combustible mixture of gases. Ignition of the gases creates hot combustion products and increases the pressure in the pressure vessel to a level sufficient to burst the burst disk. When the burst disk is ruptured, an outlet is created in the pressure vessel for the hot gas effluent. A passageway directs the hot gas effluent from the outlet in the pressure vessel to the air bag.

After the burst disk ruptures, the separated disk falls into the passageway where the hot gas is flowing. Retention of the separated disk in the center of the passageway downstream from the opening would aid in the operation of the apparatus.

The igniter means which ignites the gases commonly includes a projectile which is propelled into and subsequently penetrates the burst disk prior to rupture of the burst disk. The projectile enters the pressure vessel followed by a jet of hot combustion products which then ignites the combustible mixture of gases. The hot combustion products, such as hot particulates, are the result of a combustion process which propels the projectile. The jet of hot combustion products is formed behind the projectile and follows the projectile into the pressure vessel, despite being opposed by the flow of the inflation fluid out of the pressure vessel. To help channel the jet flow efficiently into the pressure vessel, it is desirable to minimize peripheral flow of the jet around the edges of the opening in the burst disk created by the penetration of the projectile.

SUMMARY OF THE INVENTION

In accordance with the present invention, an apparatus for inflating an inflatable vehicle occupant protection device, such as an air bag, comprises a pressure vessel means having a closure wall and a means for forming a first opening in the closure wall. The pressure vessel defines a chamber for containing a source for inflation fluid for inflating the vehicle occupant protection device. The closure wall blocks the inflation fluid from flowing out of the pressure vessel. A breakaway section of the closure wall has an inner surface which defines the first opening. The breakaway section breaks away from the closure wall when a predetermined pressure level in the chamber is reached. When the breakaway section breaks away, a second opening in the closure wall is formed. Means are provided for directing the inflation fluid from the second opening into the vehicle occupant protection device.

In accordance with a principal feature of the invention, the apparatus further includes a member coaxial with the first opening. The member has an outer surface. The member projects through the first opening in the breakaway section after the breakaway section has broken away from the closure wall. Thereafter, the outer surface of the member supports and retains the breakaway section of the closure wall.

In a preferred embodiment of the present invention, the source for inflation fluid comprises a combustible mixture of gases. The means for forming a first opening in the closure wall includes a projectile means for forcefully penetrating a center portion of the breakaway section of the closure wall and forming the inner surface which defines the first opening in the closure wall. The projectile means is supported and directed towards the center portion of the breakaway section by an inner surface of the member. Upon penetrating the closure wall and entering the chamber, the projectile means increases the pressure of the combustible mixture of gases to the predetermined pressure level for breaking away of the breakaway section.

The member is located in close axial proximity to the center portion of the breakaway section. When the projectile means penetrates the center portion, the close proximity of the member to the center portion helps to effectively channel a jet of hot combustion products which follow the projectile into the pressure vessel means. Effective channeling of this jet of hot combustion products improves the ignition characteristics of the apparatus.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
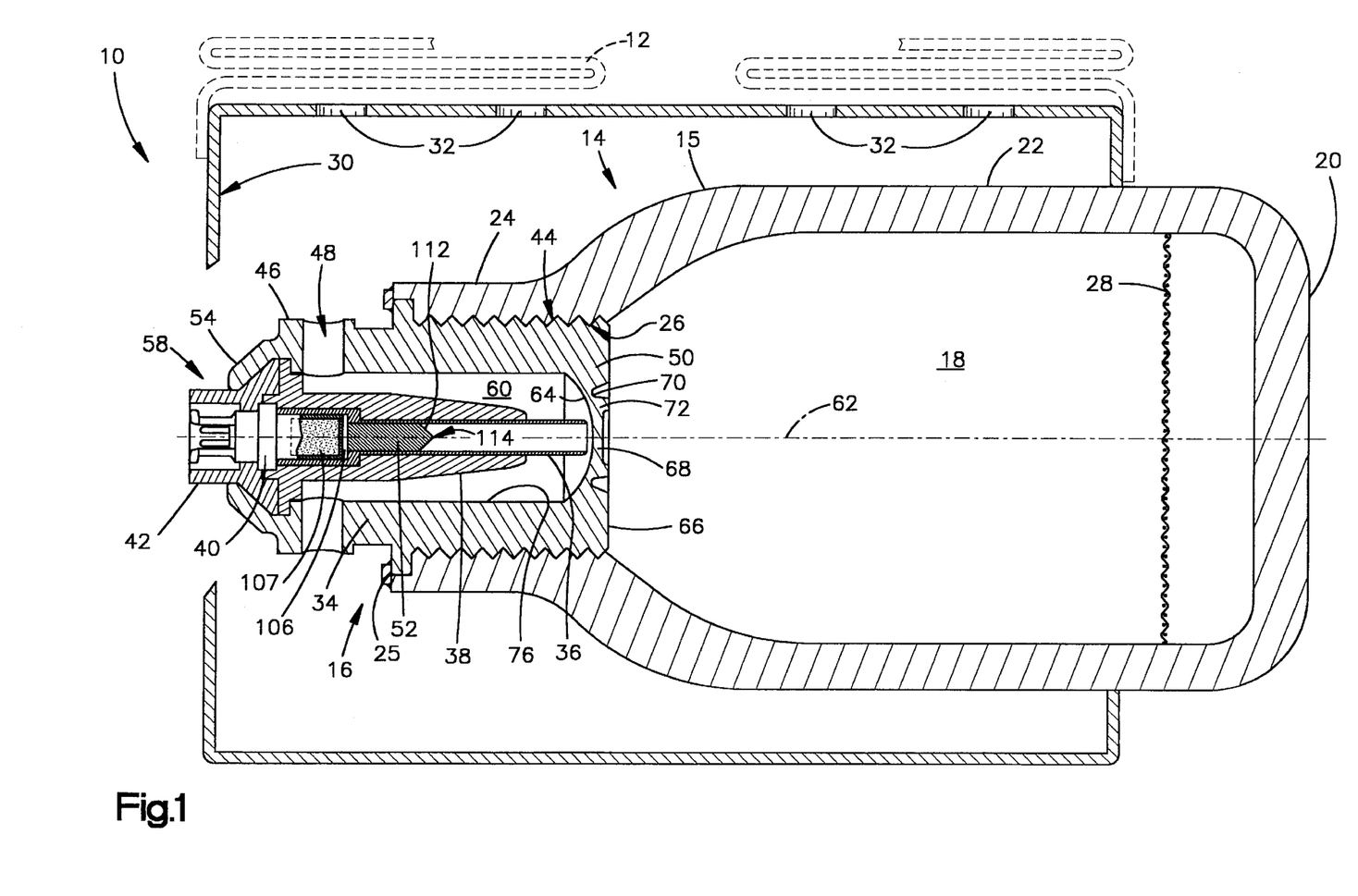
FIG. 1 is a schematic sectional view of an air bag inflator assembly constructed in accordance with the present invention, showing the inflator assembly in an unactuated condition.

Referring to FIG. 1, an inflator assembly 10 provides inflation fluid for inflating an inflatable vehicle occupant protection device, such as an air bag 12. The inflator assembly 10 comprises a pressure vessel 14. The pressure vessel 14 includes a bottle member 15 and an actuator assembly 16. The bottle member 15 and the actuator assembly 16 together define a chamber 18 containing the inflation fluid for inflating the air bag 12. The inflation fluid in the chamber 18 preferably comprises a combustible mixture of gases as is well known in the art. A diffuser 30, only parts of which are shown in FIG. 1 for clarity of illustration, has diffuser nozzles 32 and connects the air bag 12 to the pressure vessel 14.

The bottle member 15, which is cylindrical in shape, has an end wall portion 20, a side wall portion 22, and a nose portion 24. The nose portion 24 is open and has a threaded inner surface 26. An optional screen 28 is shown inside the bottle member 15.

The actuator assembly 16 comprises an annular endplug 34, a tube member 36, an actuator housing 38, a squib 40, a projectile member 52, and an adapter 42. The annular endplug 34 has a first outer surface portion 44 which is threaded to mate with the threaded inner surface 26 of the bottle member 15 and a second outer surface portion 46 which includes a plurality of gas nozzles 48. The annular endplug 34 further has a closure wall 50 at one end, a conical end wall 54 at an opposite end which has an opening 58, and an inner surface 76. The inner surface 76 partially defines an internal annular passageway 60 extending in an axial direction from the opening 58 to the closure wall 50. The internal passageway 60 and the annular endplug 34 are centered about an axis 62. The gas nozzles 48 in the annular endplug 34 are oriented perpendicular to the axis 62.

Figure 2:
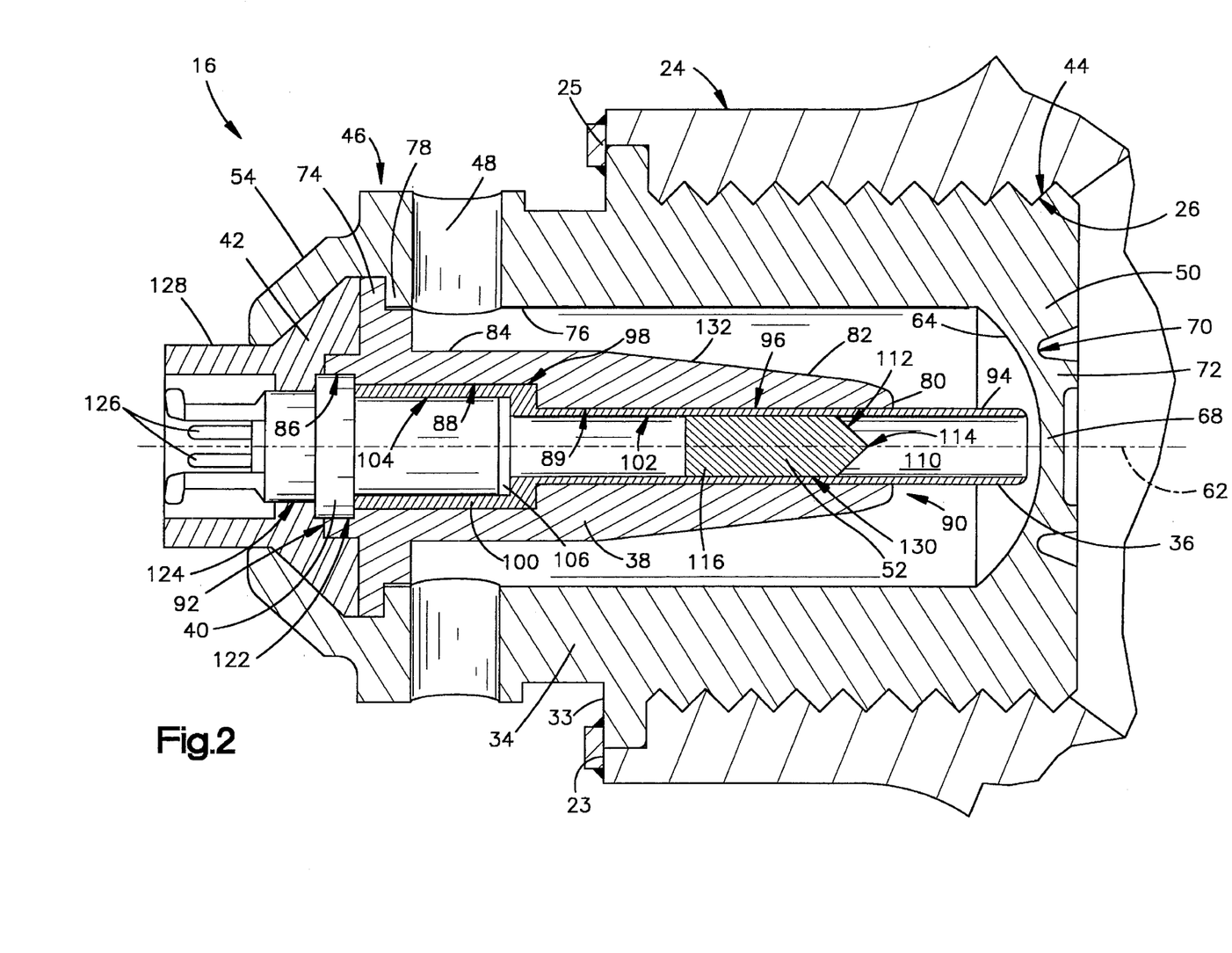
FIG. 2 is an enlarged view of a portion of the inflator assembly of FIG. 1 showing parts in different positions.

The annular endplug 34 and the bottle member 15 are threadedly connected and sealed by an annular weld ring 25. As best shown in FIG. 2, the weld ring 25 is located adjacent an annular surface 33 of the endplug 34 and an annular surface 23 on the nose portion 24 of the bottle member 15. The weld ring 25 is preferably made of 6061-T6 aluminum material. The weld ring 25 overlies the annular surface 33 of the endplug 34 and the annular surface 23 of the bottle member 15. The weld ring 25 is friction welded to the annular surface 33 and the annular surface 23 to provide a hermetic seal between the bottle member 15 and the endplug 34.

When the endplug 34 and the bottle member 15 are assembled together, the closure wall 50 of the annular endplug 34 faces the chamber 18. The conical end wall 54 and the opening 58 face away from the bottle member 15.

The closure wall 50 has an arcuate first surface 64 and a planar second surface 66 opposite the first surface, with the planar second surface 66 becoming an inside surface of the pressure vessel 14 upon assembly of the annular endplug 34 and the bottle member 15. The planar second surface 66 has a predefined puncturable center portion 68 located concentrically inside a predefined circular rupturable portion 70. Both the center portion 68 and the rupturable portion 70 are centered on the axis 62. As shown in enlarged detail in FIG. 2 where the projectile member 52 is in a different position, a ring-shaped breakaway section 72 of the closure wall 50 is located radially between the puncturable center portion 68 and the circular rupturable portion 70 of the closure wall 50.

The actuator housing 38 is annular in shape and has a first open end 80, a first outer surface portion 82, a second outer surface portion 84, a radially outward projecting flange portion 74, a second open end 92, a first inner surface portion 89, a second inner surface portion 88, and a third inner surface portion 86. The first, second, and third inner surface portions 89, 88 and 86 together define a through hole 90 in the actuator housing 38 which is centered on the axis 62. The actuator housing 38 is mounted inside the internal passage 60 in the annular endplug 34 via the flange 74 on the actuator housing 38 which engages a radially inward projecting flange portion 78 of the inner surface 76 of the annular endplug 34. The first outer surface portion 82 of the actuator housing 38 is conical in shape with its smallest diameter being at the first open end 80. The conical first outer surface portion 82 extends axially from the first open end 80 to the second outer surface portion 84. The second outer surface portion 84 is cylindrical and abuts the flange portion 74 which is located radially outward from the second open end 92 of the actuator housing 38. The first and second outer surface portions 82 and 84 together comprise an inner surface portion 132 of the annular passageway 60 in the annular endplug 34.

The third inner surface portion 86 of the actuator housing 38 begins at the second open end 92 of the actuator housing 38 and extends axially towards the first open end 80. The third inner surface portion 86 is cylindrical in shape and terminates at the second inner surface portion 88, which is also cylindrical in shape and has a smaller diameter than the third inner surface portion 86. The second inner surface portion 88 terminates at the cylindrical first inner surface portion 89, which then extends to the first open end 80 of the actuator housing 38. The first inner surface portion 89 has a smaller diameter than the second inner surface portion 88.

The tube member 36 is tubular in shape and is also centered on the axis 62. The tube member 36 has a guide end portion 94, a base end portion 100, a first outer surface 96, a second outer surface 98, and a smooth inner surface 102 which defines a projectile pathway 110. The base end portion 100 of the tube member 36 includes an internal surface 104 which defines a cylindrical cavity 106 in the tube member 36. The squib 40 is located in the cavity 106 and is filled with a pyrotechnic material 107 (FIG. 1) such as $ZrKClO_4$ or other such material known in the art. The inner surface 102 of the tube member 36 extends from the cavity 106 in the base end portion 100 through the guide end portion 94 of the tube member 36.

The tube member 36 fits snugly into the through hole 90 in the actuator housing 38. The second outer surface 98 of the member 36, which is located on the base end portion 100, is engaged and supported by the second inner surface portion 88 of the actuator housing 38. A portion of the first outer surface 96 of the tube member 36, but not all of the first outer surface 96, is engaged and supported by the first inner surface portion 89 of the actuator housing 38. The guide end portion 94 of the tube member 36 extends beyond the first open end 80 of the actuator housing 38 in a cantilevered fashion. Further, the guide end portion 94 of the tube member 36 extends such that, when the inflator assembly 10 is assembled, the guide end portion 94 is axially in close proximity to the arcuate inner surface 64 of the closure wall 50 at the center portion 68 along the axis 62.

In the unactuated condition shown in FIG. 1, the projectile member 52, which has a circular cross section, is located in and supported by the tube member 36 near the base end portion 100 of the tube member 36. An outer surface 130 of the projectile member 52 is closely received against the inner surface 102 of the tube member 36 with a releasable interference fit. The projectile member 52 has a conical forward portion 112 which forms a pointed tip 114 at its forwardmost point and an aft portion 116. The conical forward portion 112 points towards the guide end portion 94 of the tube member 36.

The squib 40 extends inside the annular endplug 34. A forward portion 122 of the squib 40 extends through the second open end 92 of the actuator housing 38. The squib 40 has an aft portion 124 which includes electrical pins 126 that extend from the squib 40. The squib 40 is secured in the inflator assembly 10 by the adapter 42 which surrounds the aft portion 124 of the squib 40. The adapter 42 and squib 40 are enclosed by the conical end wall 54 of the annular endplug 34, except for the electrical pins 126 and an aft portion 128 of the adapter 42 which extend out from the annular endplug 34 through the opening 58.

In operation, when the vehicle experiences a sharp deceleration indicative of a collision, an actuation signal is generated and an electrical current passes through the squib 40 between the electrical pins 126. The electrical current ignites the pyrotechnic material 107 in the squib 40. The pyrotechnic material 107 produces combustion products which are initially contained in the cavity 106 of the tube member 36. The gaseous components of the combustion products increase in pressure as the pyrotechnic material 107 and the ignitable material 120 burns. While the squib 40 is securely held in place by the adapter 42 and the conical end wall 54 of the annular endplug 34, the projectile member 52 is releasably held in the tube member 36 by the interference fit.

When the increasing gas pressure in the cavity 106 reaches a predetermined level, the force of the gas pressure acting axially against the projectile member 52 becomes great enough to overcome the interference fit. The force of the gas pressure then propels the projectile member 52 at a high velocity down the inner surface 102 in the guide end portion 94 of the tube member 36, as shown in FIG. 2, towards the arcuate inner surface 64 of the closure wall 50 which is in close axial proximity to the distal end of the tube member 36. The mass of the projectile member 52 and the velocity of the projectile member 52 combine to give the projectile member 52 sufficient kinetic energy to penetrate and break through the closure wall 50. The projectile member 52 contacts and penetrates the closure wall 50 at the center portion 68 along the axis 62.

Figure 3:
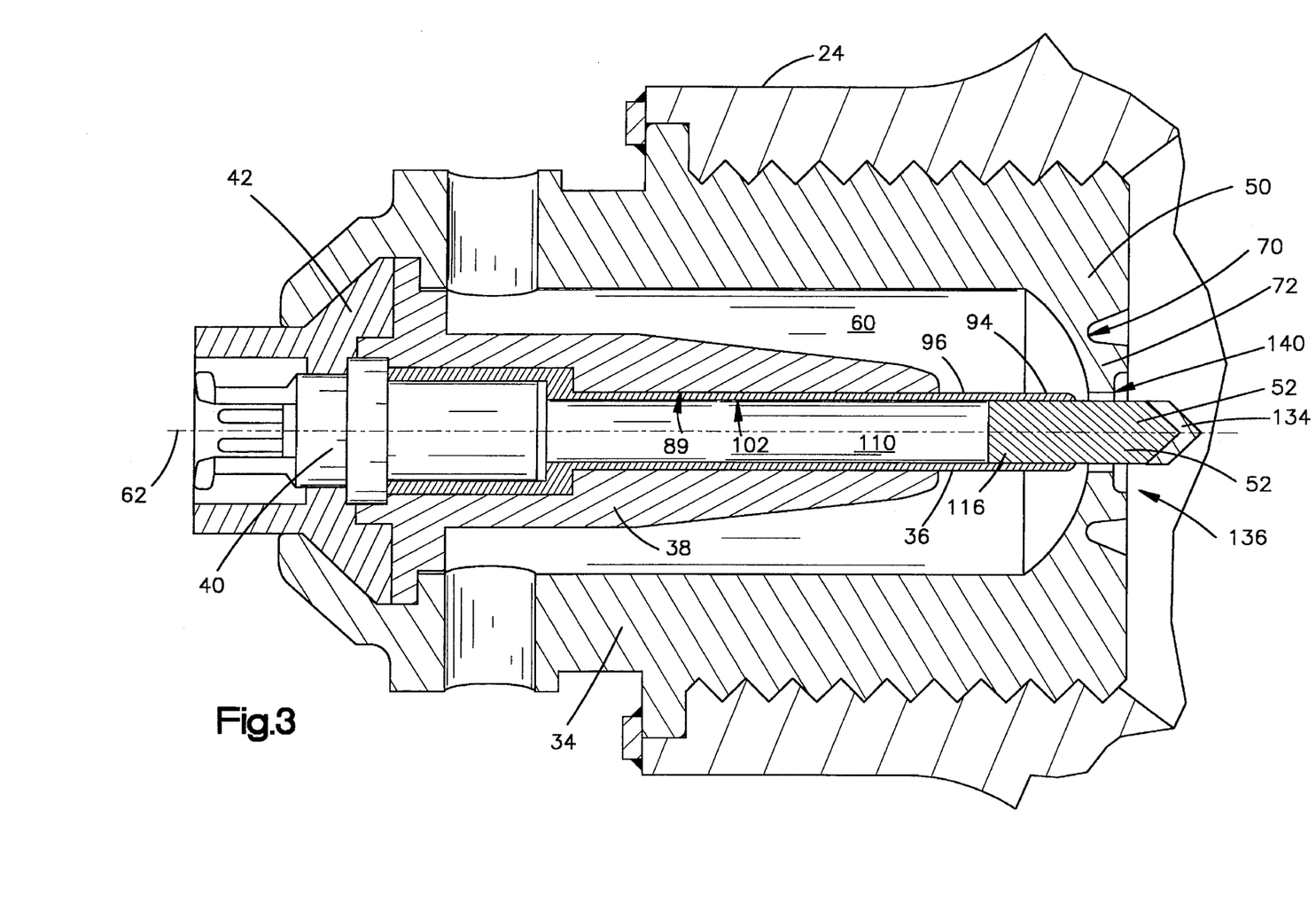
FIG. 3 is a view similar to FIG. 2 showing parts in other positions.
Figure 4:
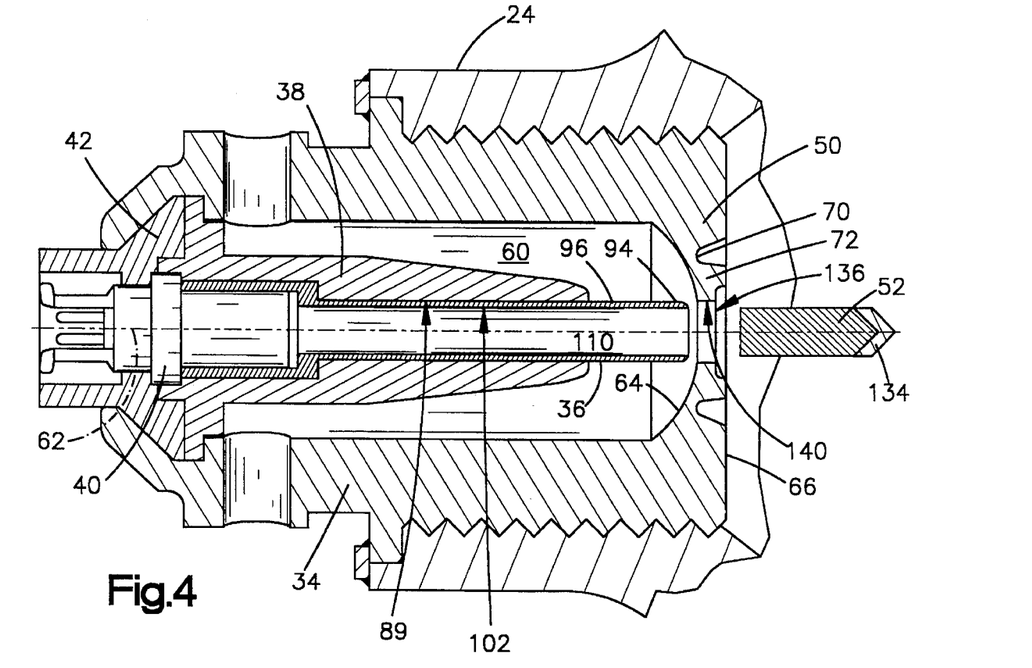
FIG. 4 is a view similar to FIG. 3 showing parts in still other positions.

As shown in FIGS. 3 and 4, when the projectile member 52 penetrates the center portion 68 of the closure wall 50, a part 134 of the closure wall 50 is severed from the closure wall 50 so as to form a first opening 136 defined by a new surface 140 in the closure wall 50. The first opening 136 has a circular shape with a diameter slightly larger than that of the projectile member 52. The first opening 136 in the closure wall 50 provides a pathway for the initial release of the mixture of gases stored under pressure in the bottle member 15 into the annular passageway 60. The close proximity of the guide end portion 94 of the tube member 36 to the closure wall 50 ensures that the hot combustion products from the pyrotechnic material 107 which follow the projectile member 52 are effectively and uniformly channeled into the chamber 18 through the opening 136 without diverging appreciably from the path of the projectile member 52.

When the projectile member 52 enters into the chamber 18, hot combustion products from the pyrotechnic material 107 in the squib 40 ignite the combustible mixture of gases stored in the chamber 18. Effective channeling by the member 36 of the combustion products and hot particulate into the mixture of gases improves the ignition characteristics of the inflator assembly 10.

The ignition of the mixture of gases in the chamber 18 causes the pressure level in the chamber 18 to increase. The mixture of gases begins to flow out of the chamber 18 at a predetermined first flow rate which is a function of, among other things, the area of the first opening 136. The released gas, which is affected by the proximity of the guide portion 94 of the tube member 36 to the first opening 136, flows through the annular passageway 60 in the annular endplug 34 to the gas nozzles 48. The gas nozzles 48 direct the gas flow into the diffuser 30 which then channels the gases through the diffuser nozzles 32 and into the air bag 12.

Figure 6:
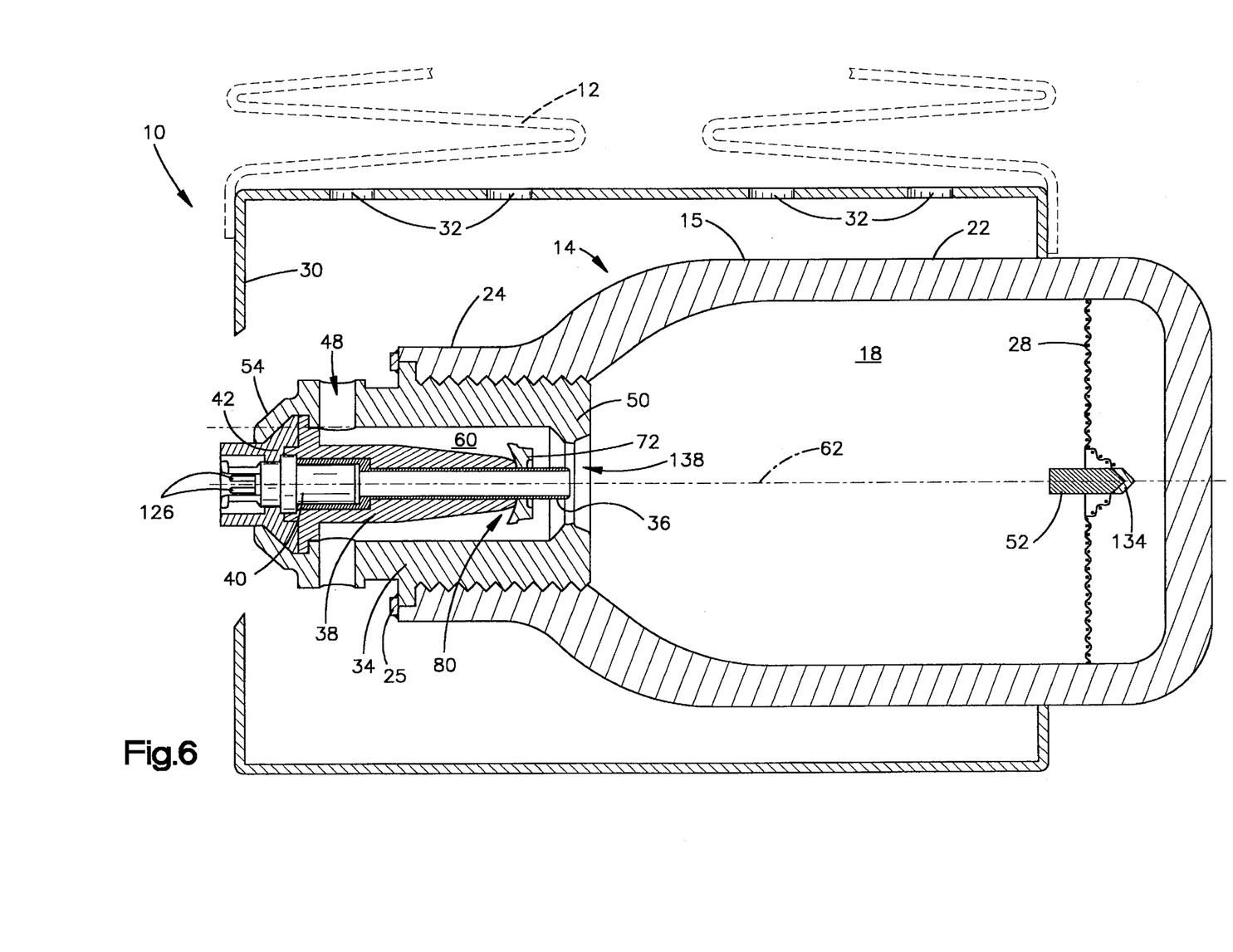
FIG. 6 is a view similar to FIG. 1 showing the inflator assembly in an actuated condition.

The projectile member 52 continues to be propelled in an axial direction along the axis 62 inside the chamber 18, dragging the combustion products such as heat, hot particulate, and hot gases along with it. The hot combustion products are dispersed throughout the chamber 18 and further ignite the combustible mixture of gases contained in the chamber. As shown in FIG. 6, the projectile member 52 is propelled through the chamber 18 until the projectile member 52 reaches the far end of the chamber 18, at which point an optional screen 28 captures the projectile member 52 along with the part 134 of the closure wall 50 which is being carried by the projectile member 52.

Although the mixture of gases has already begun to flow out of the chamber 18 through the first opening 136 while the pressure is being increased inside the chamber 18, the breakaway section 72 of the closure wall 50 continues to be subjected to a gas pressure differential between the surfaces 64 and 66. Accordingly, the gas pressure differential across the breakaway section 72 increases with the increasing pressure inside the chamber 18. When the gas pressure differential reaches a predetermined elevated level, the resulting pressure force, which acts axially outward against the second surface 66 of the breakaway section 72, reaches a corresponding predetermined elevated level. The circular rupturable portion 70 of the closure wall 50, which defines the outside diameter of the breakaway section 72, functions as a stress riser in the closure wall 50 and ruptures under the force of the elevated pressure level. When the circular rupturable portion 70 ruptures, the ring-shaped breakaway section 72 of the closure wall 50 is released for axial movement away from the closure wall 50 in the direction of the flowing gases.

Figure 5:
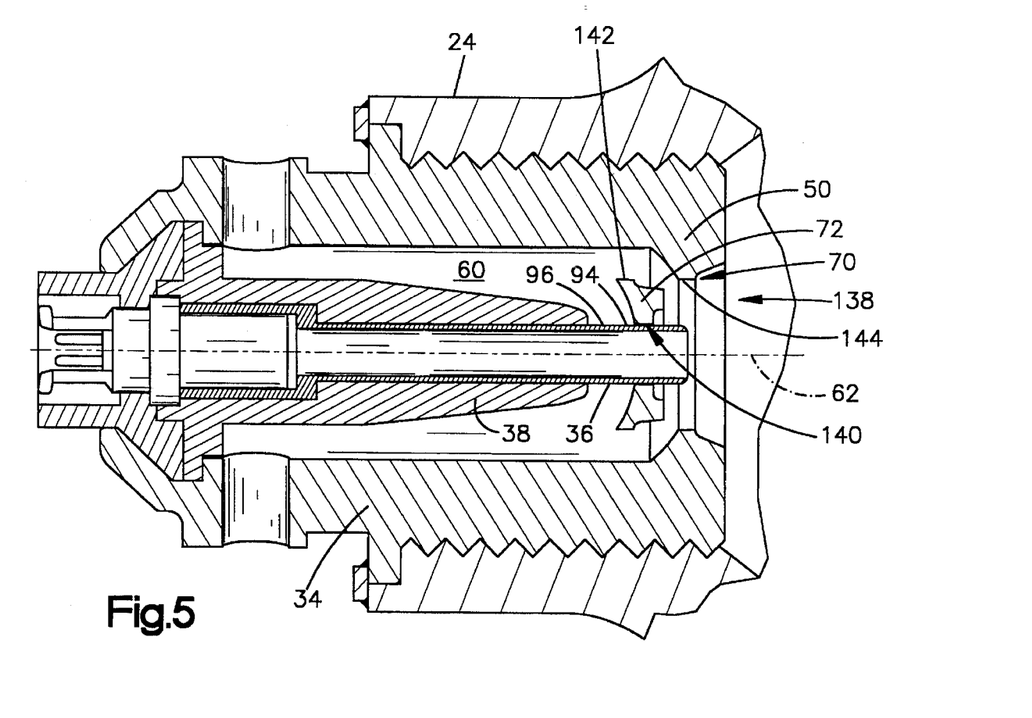
FIG. 5 is a view similar to FIG. 4 showing parts in yet other positions.

As shown in FIG. 5, the release of the ring-shaped breakaway section 72 forms a circular second opening 138 defined by a new surface 144 in the closure wall 50. The second opening 138 has a larger diameter and area than that of the first opening 136, thus permitting the mixture of gases to flow into the annular passageway 60 at a higher second flow rate. The flow rate is further increased by the increased pressure attained through the continuing combustion in the chamber 18.

Also shown in FIG. 5 is the axial movement of the breakaway section 72. After the breakaway section 72 is broken away from the closure wall 50 at the rupturable portion 70, the ring-shaped breakaway section 72 has the circular inner surface 140 and fractured edges comprising an outer surface 142. The diameter of the outer surface 142 is defined by the diameter of the circular rupturable portion 70. The inner surface 140 of the breakaway section 72 slides onto the first outer surface 96 of the tube member 36 at the guide end portion 94 which is in close proximity to the breakaway section 72 and is thereby supported by the tube member 36. The breakaway section 72 continues to slide axially away from the closure wall 50 on the first outer surface 96 of the tube member 36, under the pressure applied by the gas flow, until the breakaway section 72 comes into contact with the first open end 80 of the actuator housing 38. Because the diameter of the actuator housing 38 at the first open end 80 is greater than the diameter of the inner surface 140 of the breakaway section 72, the breakaway section 72 is prevented from further axial movement by the contact with the actuator housing 38. Under the pressure of the flowing gases and the support of the tube member 36, the breakaway section 72 is retained in this position throughout the remainder of the inflation process.

With the breakaway section 72 seated up against the actuator housing 38, the gases can flow through the larger second opening 138 in the closure wall 50 and into the annular passageway 60. In its retained position, the breakaway section 72 is perpendicular to the flow of the gases which pass over and around its outer surface 142. In this position, with the breakaway section 72 retained in the center of the annular passageway 60 by the tube member 36 which is centered on the axis 62, the flow of the hot gases is uniformly affected by the presence of the separated breakaway section 72 in the flow stream.

Although the preferred embodiment of the present invention uses a combustible mixture of gases to provide heat which further pressurizes the inflation fluid in the chamber 18, an alternative embodiment of the invention could include the use of a solid ignitable material which, when burning inside the chamber 18, heats and further pressurizes the stored inflation fluid with the same result.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protection device, said apparatus comprising:

a pressure vessel means for defining a chamber containing a source of inflation fluid for inflating the vehicle occupant protection device, said pressure vessel means including a closure wall for blocking the flow of said inflation fluid;

means for forming a first opening in said closure wall;

a breakaway section of said closure wall having an inner surface defining said first opening, said breakaway section being broken away from said closure wall when a predetermined pressure level in said chamber is reached and forming a second opening in said closure wall of said pressure vessel;

a member coaxial with said first opening and having an outer surface, after said breakaway section is broken away from said closure wall, said member projecting through said first opening and said outer surface supporting and retaining said breakaway section; and means for directing said inflation fluid from said second opening into the vehicle occupant protection device.

2. Apparatus as defined in claim 1 wherein said source for inflation fluid comprises a combustible mixture of gases.

3. Apparatus as defined in claim 1 wherein said means for forming a first opening further includes a projectile means for forcefully penetrating a center portion of said breakaway section of said closure wall, thereby forming said inner surface of said closure wall which defines said first opening in said closure wall.

4. Apparatus as defined in claim 3 wherein said member has an inner surface for supporting said projectile means and directing said projectile means towards said center portion of said breakaway section of said closure wall.

5. Apparatus as defined in claim 3 wherein said projectile means enters said chamber and causes increase in the pressure inside said chamber.

6. Apparatus as defined in claim 1 wherein said second opening in said closure wall includes and replaces said first opening in said closure wall.

7. Apparatus as defined in claim 4 wherein said member is tubular in shape and said inner and outer surfaces are concentric about a central axis.

8. Apparatus as defined in claim 7 wherein said member has a first end portion and a second end portion, said first end portion being supported by a housing and said second end portion being cantilevered out from said housing.

9. Apparatus as defined in claim 8 wherein said outer surface of said member in said cantilevered second end portion receives and supports said breakaway section after said breakaway section is broken away from said closure wall.

10. Apparatus as defined in claim 8 wherein said second end portion of said member is located in close axial proximity to said center portion of said breakaway section.

11. Apparatus as defined in claim 10 wherein said projectile means, when actuated, is forcefully projected from said second end portion of said member and into said center portion of said breakaway section.

12. Apparatus as defined in claim 10 wherein said projectile means, when actuated, is followed by a jet of hot combustion products which are effectively channeled into said first opening in said closure wall by the close proximity of said second end portion of said member to said center portion of said breakaway section of said closure wall.

13. An apparatus for inflating an inflatable vehicle occupant protection device, said apparatus comprising:

a pressure vessel means for defining a chamber for containing a combustible mixture of gases under pressure, said pressure vessel means including a closure wall having a circular rupturable portion;

an actuator means for entering said chamber and for increasing the pressure inside said chamber by igniting said mixture of gases, said actuator means including a projectile member which, when actuated, forcefully penetrates a center portion of said closure wall thereby forming a first gas outlet opening, said first gas outlet opening providing for the initial release of gases at a first gas flow rate;

said circular rupturable portion being ruptured when said pressure is increased beyond a predetermined pressure level by said actuator means and subsequently forming a second gas outlet opening in said closure wall which supplants said first gas outlet opening, said second gas outlet opening providing for the release of said mixture of gases at a second gas flow rate;

a ring-shaped breakaway section of said closure wall having an outer surface defined by the diameter of said circular rupturable portion and an inner surface defining said first gas outlet opening, said ring-shaped breakaway section being broken away from said closure wall at said circular rupturable portion when said predetermined pressure level is reached;

a cylindrical guide tube member having an inner surface, an outer surface, and a guide end portion axially located in close proximity to said center portion of said closure wall;

said inner surface of said cylindrical guide tube member supporting said projectile member and guiding said projectile member, when actuated, towards said center portion of said rupturable portion of said closure wall;

said outer surface of said cylindrical guide tube member receiving said inner surface of said breakaway section after said breakaway section is broken away from said closure wall, and thereafter retaining said breakaway section; and directing means for directing said mixture of gases from said first and second gas outlet openings into the vehicle occupant protection device.

14. Apparatus as defined in claim 13 wherein said breakaway section, after being broken away from said closure wall, further includes fractured edges comprising said outer surface of the breakaway section and defined by the diameter of said circular rupturable portion.

15. Apparatus as defined in claim 13 wherein said projectile member, when actuated, is followed by a jet of hot combustion products which are effectively channeled into said first opening in said closure wall by the close proximity of said guide end portion of said cylindrical guide tube member to said center portion of said closure wall.

16. Apparatus as defined in claim 13 wherein said cylindrical guide tube member further has a base end portion which is mounted in an actuator housing, said actuator housing having a first inner surface defining an annular cavity for receiving and mounting said base end portion of said cylindrical guide tube member.

17. Apparatus as defined in claim 16 wherein said actuator housing has a first open end and a second open end, said first open end facing said closure wall of said pressure vessel means, said guide end portion of said cylindrical guide tube member extending out of said first open end of said actuator housing in cantilevered fashion.

18. Apparatus as defined in claim 17 wherein said actuator housing further has a first outer surface portion extending away from said first open end of said actuator housing, said first outer surface portion having a conical shape with a minimum diameter greater than the diameter of said first gas outlet opening in said breakaway section of said closure wall.

19. Apparatus as defined in claim 18 wherein said breakaway section, after being broken away from said closure wall, slides onto said outer surface of said cylindrical guide tube member and, under the pressure applied by the release of gases, continues sliding on said outer surface until said breakaway section contacts said first outer surface portion of said actuator housing.

* * * * *